E. J. BROWN.
POULTRY FEED HOPPER.
APPLICATION FILED APR. 11, 1919.

1,335,424.

Patented Mar. 30, 1920.

Inventor:
Edwin J. Brown
By Chafin & Ferguson
Attorney

UNITED STATES PATENT OFFICE.

EDWIN J. BROWN, OF BOONE, MARYLAND.

POULTRY-FEED HOPPER.

1,335,424.　　　Specification of Letters Patent.　　Patented Mar. 30, 1920.

Application filed April 11, 1919. Serial No. 289,276.

*To all whom it may concern:*

Be it known that I, EDWIN J. BROWN, a citizen of the United States, residing at Boone, in the county of Anne Arundel and State of Maryland, have invented certain new and useful Improvements in Poultry-Feed Hoppers, of which the following is a specification.

This invention relates to improvements in poultry feed hoppers, and has for its object to provide a simple, cheap and convenient hopper from which the poultry can readily feed and which is so constructed that the said feed will not be scattered out upon the ground.

The invention consists of the novel construction and arrangement of the parts and combination of parts hereinafter more fully set forth in the following specification and pointed out in detail in the appended claims.

In the accompanying drawings,—

Figure 1:
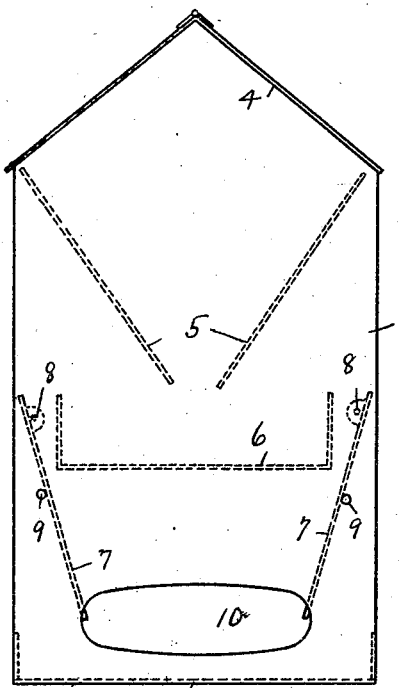
Figure 1 is a front elevation of my invention.
Figure 2:
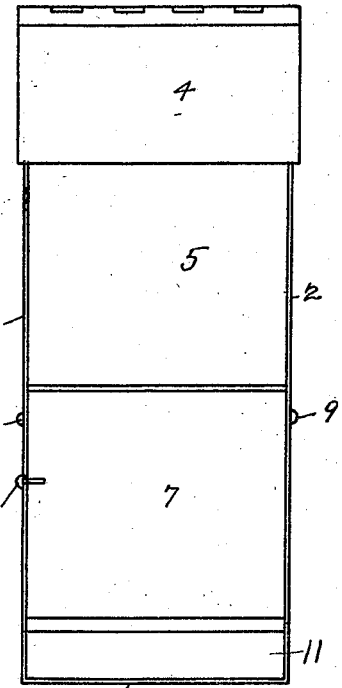
Fig. 2 is a side elevation of same.
Figure 3:
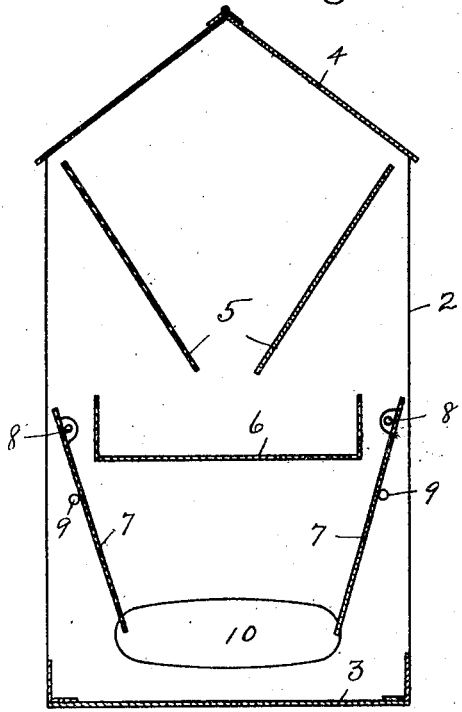
Fig. 3 is a vertical transverse section of Fig. 1.

Referring to the accompanying drawings, forming part of this specification, and in which like reference numerals designate like parts throughout the several views thereon, 1 designates the front and 2 the back, 3 the bottom and 4 a hinged cover. Extending across from the front 1 to the back 2, on the inside thereof, are two converging pieces 5 which form a hopper, and below the said hopper is a trough 6 extending across and connected to the said front and back 1 and 2, respectively. Said trough 6 is adapted to hold the feed as it is fed downwardly from the hopper 5. The sides of the device are open so that the poultry can reach through and pick the feed from the trough 6. At each side of the trough 6 is a pivoted gate 7 pivoted at 8 and held in the inclined position shown in the drawings by the pins 9 which project through the front 1. Projecting upwardly from the bottom 3 at each side is a short piece 11 which holds the feed in the bottom 3 as it falls from the hopper. The inclined position of the gates 7 form an opening between the lower ends and the piece 11, through which the poultry can reach the feed that falls into the bottom 3. These gates 7 serve to catch the feed that is thrown out by the poultry when feeding from the trough 6; said feed falling down between the trough 6 and the gates 7 to the bottom 3 where it can be reached by the poultry either from the sides or through the openings 10 in the front and back 1 and 2, respectively. When it is desired to shut off access to the trough 6 the pins 9 are removed and the gates 7 swung upwardly with their ends resting against the sides of the hopper 5.

Having thus described my invention, what I claim is:

1. A poultry feeding device for dry feed, consisting of a hopper, a feed pan immediately beneath and in coöperative relation with the hopper, a second feed pan spaced beneath the first, both feed pans being open for access by the fowls, and a pivoted shaker plate leading from a point outside and adjacent the upper pan, downward and inward to a point well inside of the lower pan, the same being adapted to catch the feed thrown out of the upper pan by the fowls in feeding, and carry it down to the lower pan, where it is also accessible to the fowls.

2. A poultry feeder, consisting of a hopper, a feed pan receiving the feed directly from the hopper, a second feed pan spaced below the first, both feed pans being open and accessible to the fowls in feeding, and an inclined plate pivoted intermediately of its length, extending from a point adjacent to, but well outside of the upper pan, downward and inward to a point inside the lower pan, the same being adapted to receive the feed thrown out of the upper pan by the fowls in feeding, and carry it downward to the lower pan, where it is also accessible to the feeding fowls, the intermediate pivot making the plate capable of vibration by the fowls as they stretch over the pivoted plate in reaching the upper pan, the vibration serving to facilitate the passage of the feed down the plate to the lower pan.

In testimony whereof I affix my signature.

EDWIN J. BROWN.